Patented Aug. 2, 1932

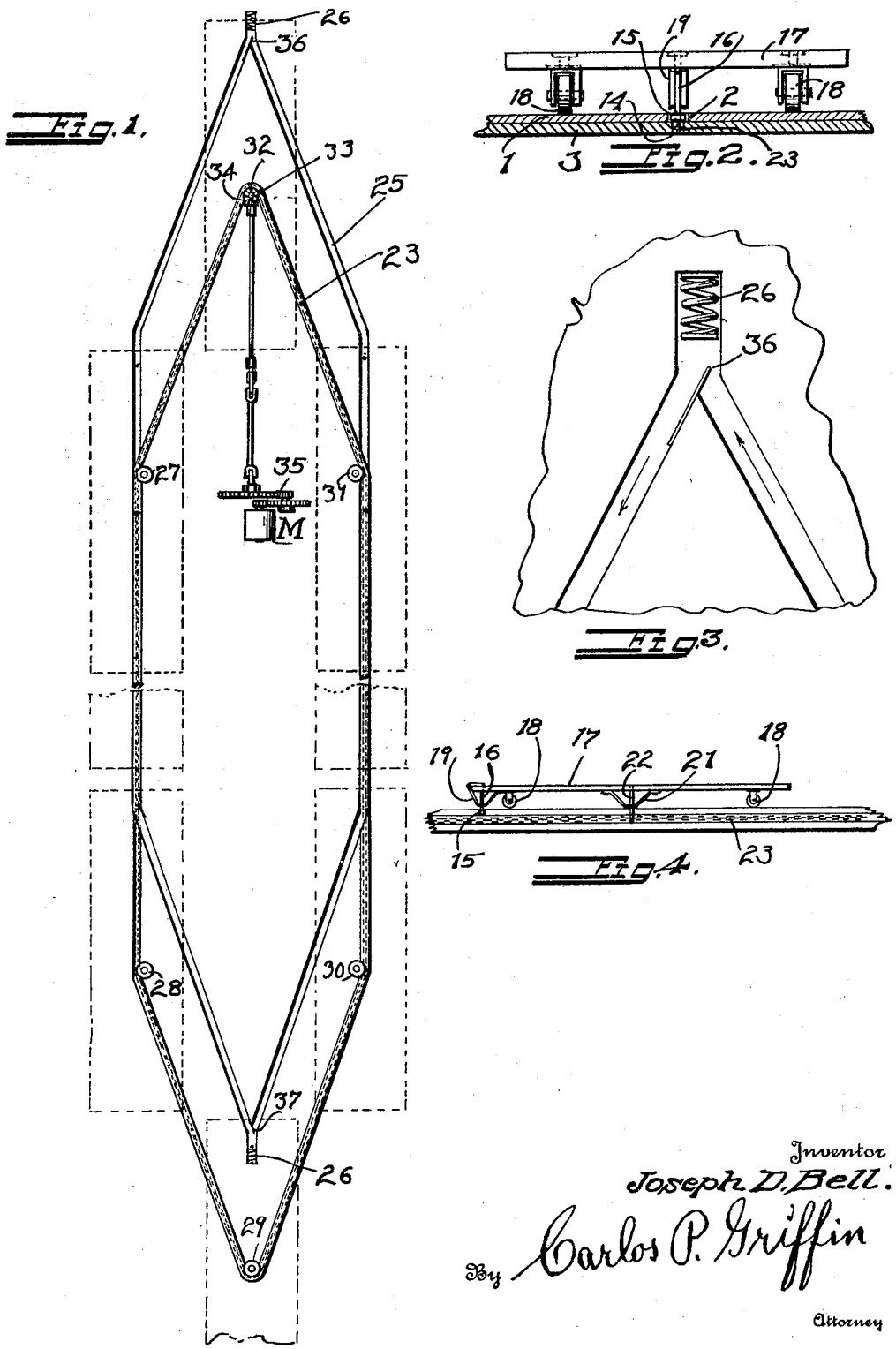

1,869,794

UNITED STATES PATENT OFFICE

JOSEPH D. BELL, OF SAN FRANCISCO, CALIFORNIA

STORAGE BUILDING FOR AUTOMOBILES

Application filed May 21, 1928. Serial No. 279,574.

This invention relates to a storage building for automobiles, and its object is to enable motor vehicles to be stored in narrow buildings with the greatest efficiency.

It will be understood by those skilled in the art that motor vehicles ordinarily require considerable room to turn around in, and if run into a long narrow building are very inconvenient to remove therefrom because it may be necessary to remove every vehicle to get the one in the end of the building. With this invention it is unnecessary to turn the motor vehicle around, a series of trucks being provided which will vary the vehicle into place in the building, and which at the same time will never make it necessary to move any car on one of a double line of trucks more than the length of the building to get it out, all of the cars being mounted upon individual trucks which will shift the cars from place to place without difficulty.

Another object of the invention is to do away with the rapid acceleration of the supporting trucks at the ends of the building, and to provide means whereby the trucks will be smoothly moved from place to place at all times.

Another object of the invention is to provide means for directing the movement of the truck carrying vehicles around the room or space in which the apparatus is installed so as to pass supporting columns or light wells and at the same time making the most efficient use of the space at hand.

Another object of the invention is to provide means for directing the movement of the truck around a building where it may be desired to display articles placed upon the several trucks, such for example as furniture, or other merchandise, each truck carrying a full load of material artistically arranged for suitable display to the public at one particular place whereby one show window can be made to give an adequate display continuously changing of a number of the loaded trucks.

Other objects of the invention will be apparent as the description proceeds.

An embodiment of the invention is shown in the accompanying drawing in which the same reference numeral is applied to the same portion throughout the several figures of the drawing and of which there may be modifications.

Figure 1 is a plan view of an installation showing portions of platforms for eight cars, portions of the installation being broken away for purposes of illustration, Figure 2 is a sectional view of a portion of the floor showing the wheels for supporting the trucks carrying the cars, Figure 3 shows the principle stop at one end of the guide cam, Figure 4 is a side elevation of the truck, the guide pin and driving pin also being shown.

The garage in which this car carrying apparatus is installed has a floor 1 which may be of any suitable material and covered with any other suitable material; the cover floor being cut away at 2, while the sub floor is illustrated at 3, said sub floor being suitably supported at any desired level.

There is a groove 14 in the floor in the lower portion of which is installed the chain, while in the upper floor there is a wider groove to receive the roller 15 on the lower end of the guide pin 16.

The car carrying truck 17 is supported by a plurality of caster wheels 18 which permit it to be easily turned in any direction, and which are large enough in size to carry a large vehicle on the platform 17. At one end of the truck there is a frame 19 for the guide pin 16, while a frame 21 carries a guide pin 22 near the center of the truck, which is connected to the drive chain 23.

The guide pin 16 carries a small roller 15 thereon which operates in the cam track 25, said track having a heavy spring 26 at each end to take up the momentum of the cars in passing around a corner. The drive chain 23 passes around the guide rollers 27 to 32 inclusive.

The apparatus is driven by means of the two bevel gears 33—34 from the gear train 35 connected with the motor M.

It will be seen from an examination of Figure 1 that if the center pin of all of the car carrying trucks is connected to the drive chain that the center of the truck will always remain in close proximity to the chain 23, while the pin 16 extending into the cam track will always remain in proximity thereto, and its general movement will be controlled by the spring flap 36, 37 there being one at each end of the cam track, and in addition to the foregoing in order to prevent the trucks from striking against the end of the building or some other object too hard the springs 26 are provided.

It will be obvious that if the building has inconveniently placed supporting columns, or if the lot in which the apparatus is installed happens to be an L shape that it will be easily possible to run the chain and cam track around a column or about the supporting columns without in any way changing the invention.

Having thus described my invention, what I desire to secure by Letters Patent of the United States is as follows, but modifications may be made in carrying out the invention as shown in the drawing and in the above particularly described form thereof, within the purview of the annexed claims.

1. A place of storage for vehicles comprising a floor having a groove therein, a cam groove secured on the floor in a higher plane than the groove, an endless chain movable in said groove, a plurality of load carrying trucks, an arm extending from one truck to the chain and connected therewith, a guide pin carried by each truck and extending into the cam groove for directing the movement of the truck around the floor as it is moved from one place to another by the endless chain.

2. A transportation system comprising a traction surface having an endless slot therein; a chain movable in the slot; a series of trucks resting on and movable on and over the traction surface having means of connection with the chain at spaced points throughout the length thereof to move the trucks in end to end relation over the traction surface with one half of all the trucks moving in one direction and the remaining trucks moving in the opposite direction, a guiding member on the traction surface operatively connected to each truck at a point spaced from the connection of the respective trucks to the chain, said guiding member being complemental to said slot but being offset relatively thereto at the turns of said slot and to reverse in a continuous movement the end to end relation of the trucks relative to each other at the time of reversing their direction of movement.

3. A transportation system comprising a traction surface having an endless slot therein; a chain movable in the slot; a guideway on the traction surface substantially paralleling the contour of the slot and being offset at its turns relatively to the slot; a series of trucks resting on and movable on and over the traction surface each having means of connection with the chain, and means of connection between each truck and the guideway being offset relatively to the first means of connection corresponding to the offset of the slot relatively to the guideway to maintain the trucks in end to end relation over the traction surface with one half of all the trucks moving in one direction and the remaining trucks moving in the opposite direction and to reverse in a continuous movement, substantially parallel with the path of the chain, the end to end relation of the trucks relative to each other at the time of reversing their direction of movement.

4. A transportation system comprising a traction surface; a series of trucks resting on and movable over the traction surface; and means including an endless conveyor element, a groove in the traction surface, a guideway complemental to said groove, and means of connection between each truck and the said element and the guideway so offset relatively to each other as to move the series of trucks continuously in parallel rows, one row of trucks moving in one direction and the other row of trucks moving in the opposite direction and the endmost trucks of the parallel rows moving laterally from one row to the other at the time of reversing the directional movement thereof without turning said endmost trucks around, said reversing movement of the trucks being uninterrupted.

5. A transportation system comprising a traction surface having a continuous groove therein; an endless chain movable in said groove; a guideway on the traction surface complementary to the groove and offset relative to said groove; a series of trucks to rest on and move over the traction surface; means on each of the trucks engageable with the endless chain and guideway to move and guide the trucks in endless procession over the surface whereby at a period in the course of travel, the guideway engaging means on each truck intersects the groove, and at another period in the course of travel, the chain engaging means intersects the guideway.

6. A transportation system comprising a traction surface having an endless groove therein; an endless chain movable in the groove; a guideway on the surface complementary to the contour of the groove; a series of trucks arranged in end to end relation over the groove and guideway and resting on the traction surface; an arm connecting each truck to the chain; a guide element on each of the trucks engaging the guideway; and means to operate the chain to move the trucks in an endless procession over the groove and guideway with one half of all the trucks moving in one direction and the remaining trucks moving in the opposite direction, said groove and said guideway being offset at each turn of the endless path and said arm and element on each truck being so spaced from each other as to endlessly reverse the end to end relation of the trucks relative to each other at the time of reversing the direction of movement thereof without turning the endmost trucks around.

7. A transportation system comprising a traction surface having an endless groove therein; an endless chain movable in the groove; a guideway on the surface complementary to the contour of the groove and being longitudinally offset relatively to said groove; a series of trucks arranged in end to end relation over the groove and resting on the guideway; an arm operatively connecting each truck to the chain and being slidable in said groove; a guide pin on each of the trucks slidably engaging the guideway; and means to operate the chain to continuously move the trucks on an endless path, the arm and the pin being so related as to maintain each truck pointed in the same direction throughout the entire travel thereof around the endless path.

8. In a system of the character described a carrier, a surface on which the carrier is movable, said surface having complemental guideways therein, one offset relatively to the other, a driving element in one of said guideways, a connecting member extended from the carrier and connected to the driving element, and a guide member on the carrier extended into the other guideway and being spaced from said connecting member to the offset of the guideways.

9. In combination a traction surface having a guideway therein; an endless chain movable below the guideway; a truck supported on the surface and connected to said chain to be moved by the chain over said surface; casters swivelly mounted on the truck; and a pin on the truck engaged with the guideway to prescribe the course of movement of the truck.

10. A transportation system for a surface area defined by a length greater than the width comprising an endless series of trucks to counter-move side by side in end to end relation throughout the length of the area; a guideway on the surface area to prescribe a path of movement of the trucks throughout the area; an endless chain moving in a groove in the surface complementary to the contour of the guideway and offset lengthwise relative thereto, to move the trucks in parallel and in opposite directions along the length of the surface area, the endmost trucks having their direction of movement reversed by an endless lateral transfer from the row of trucks moving in one direction to the row of trucks moving in the opposite direction, without turning said endmost trucks around.

JOSEPH D. BELL.